June 2, 1942. W. RUSKA 2,285,056
PARKING METER
Filed Nov. 28, 1938 5 Sheets-Sheet 1
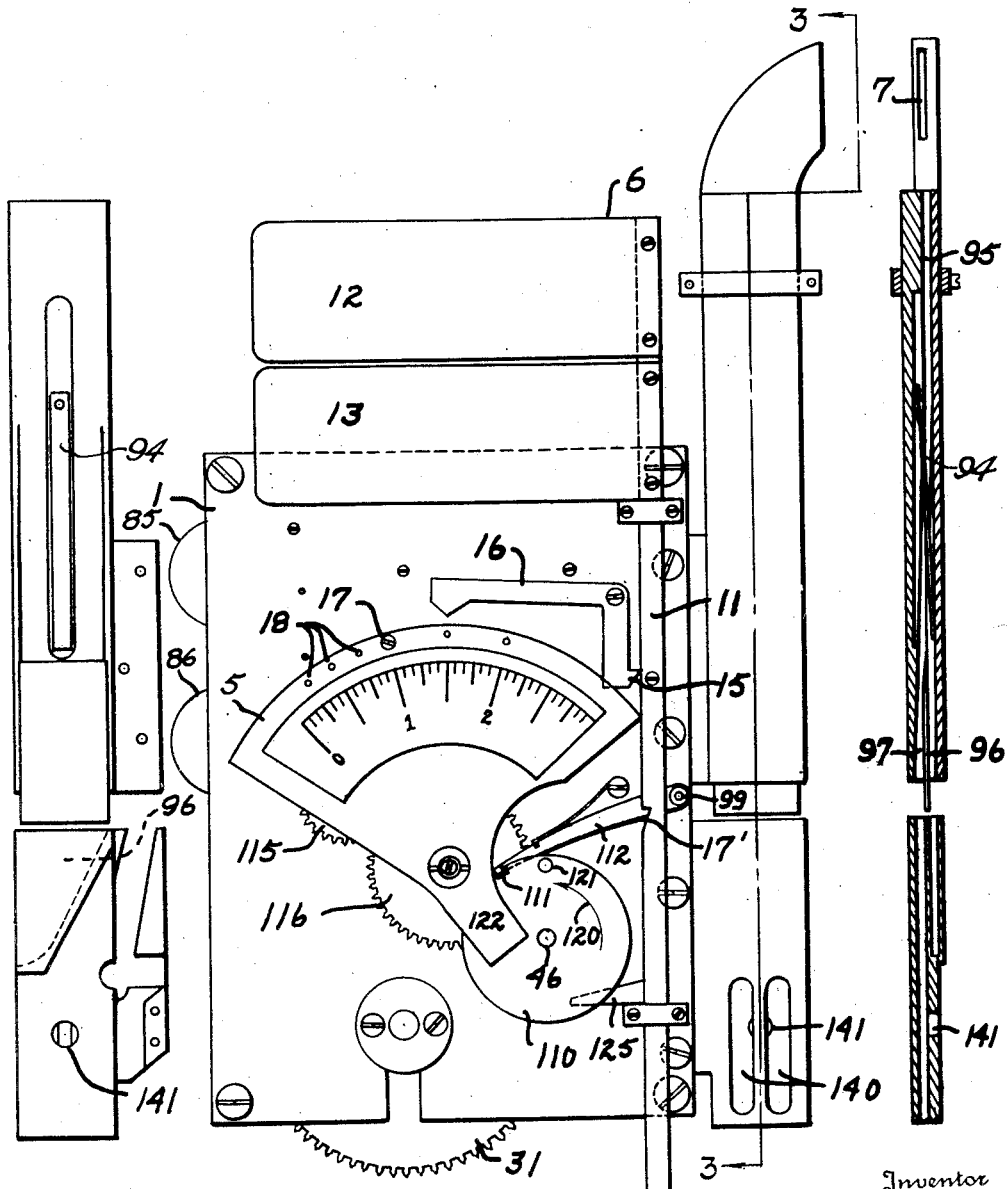

June 2, 1942.  W. RUSKA  2,285,056
PARKING METER
Filed Nov. 28, 1938  5 Sheets-Sheet 2

Inventor
WALTER RUSKA

June 2, 1942. W. RUSKA 2,285,056
PARKING METER
Filed Nov. 28, 1938 5 Sheets-Sheet 3

Inventor
WALTER RUSKA
By Jesse R. Stone & Lester B. Clark
Attorneys

June 2, 1942.  W. RUSKA  2,285,056

PARKING METER

Filed Nov. 28, 1938  5 Sheets-Sheet 4

Inventor
WALTER RUSKA

By  Jesse R. Stone
&  Lester B. Clark

Attorneys

June 2, 1942.  W. RUSKA  2,285,056
PARKING METER
Filed Nov. 28, 1938  5 Sheets-Sheet 5
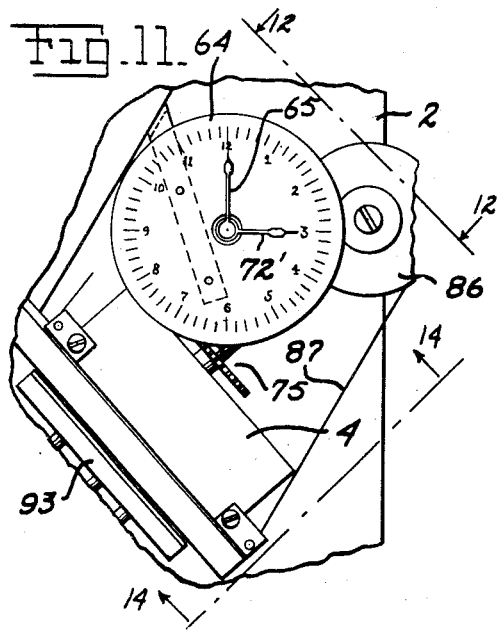
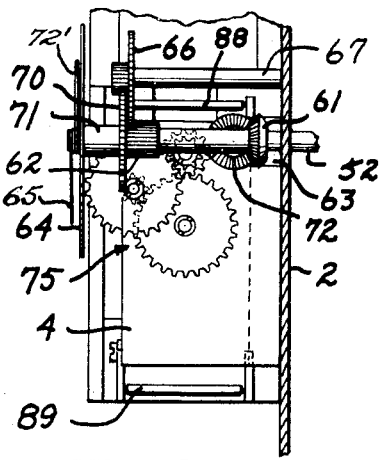
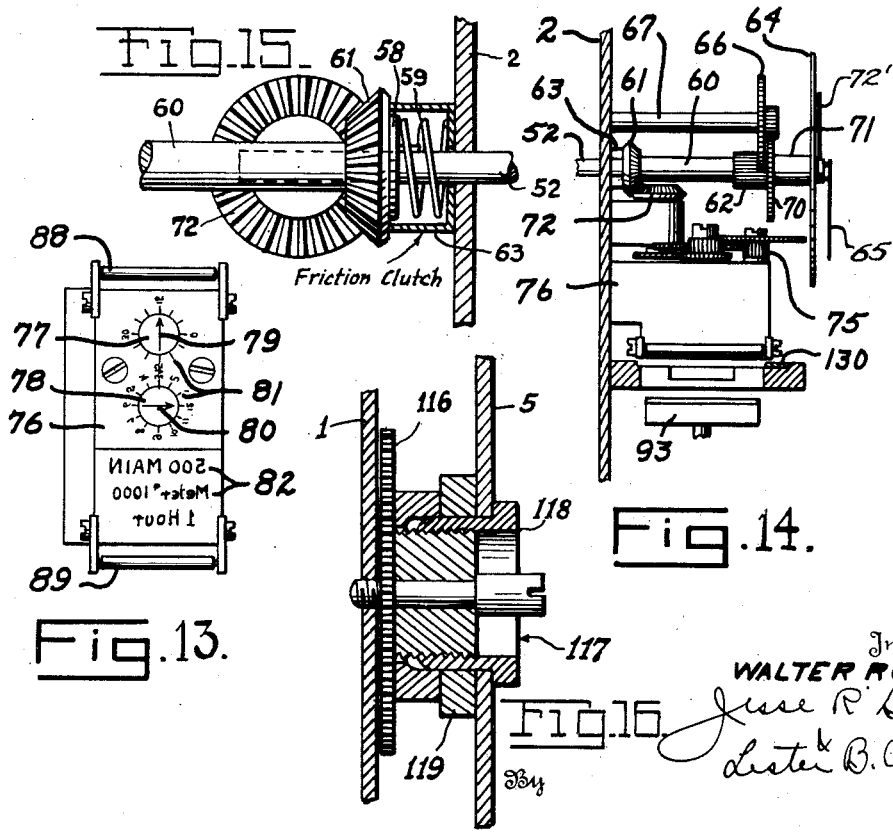
Inventor
WALTER RUSKA Patented June 2, 1942

2,285,056

UNITED STATES PATENT OFFICE 2,285,056

PARKING METER

Walter Ruska, Houston, Tex., assignor, by mesne assignments, of forty per cent to Vehicular Parking, Ltd., Washington, D. C., a corporation of Delaware Application November 28, 1938, Serial No. 242,801

4 Claims. (Cl. 194—19)

The invention relates to parking meters such as are employed along streets to control the parking of vehicles by indicating when a predetermined time interval has elapsed after the meter has been placed in operation by the insertion of a suitable coin or token.

It is an object of the invention to provide a coin controlled device which is automatic in operation upon the insertion of a proper coin therein.

It is also an object of the invention to provide a device in which there is displayed a semaphore or flag which is actuated to indicate when a predetermined time interval has elapsed.

A further object is to provide a device which will issue a printed ticket indicating the time of the beginning of a parking interval.

Still another object is the provision of a device which is capable of indicating a recorded time and also in providing motive power for additional operations.

Another object is to provide a spring actuated driving mechanism having a floating spring barrel so that a single spring may be utilized for actuating a plurality of elements in the device.

These and other objects will be apparent from the following description taken in connection with the drawings illustrating an embodiment of the invention and in which:

Fig. 1 is a front elevation of the device showing the position of parts after the parking time limit has been exhausted.

Fig. 2 is a rear view of the coin receiving chute, the cover plate of the upper portion thereof having been removed for purposes of illustration.

Fig. 3 is a cross sectional view through the coin receiving chute taken on line 3—3 in Fig. 1.

Fig. 11 is a partial rear elevation showing the time indicating and setting dial.

Fig. 12 is a sectional view taken on line 12—12 in Fig. 11.

Fig. 13 is a bottom plan view of the time recording unit.

Fig. 14 is a sectional view taken on line 14—14 of Fig. 5.

Fig. 15 is a detail showing the clutching connection between the driving shaft and the time indicating and recording mechanisms.

Fig. 16 is an enlarged detail showing the frictional connection between the driving mechanism and the time interval indicator dial.

Figures 4, 5:
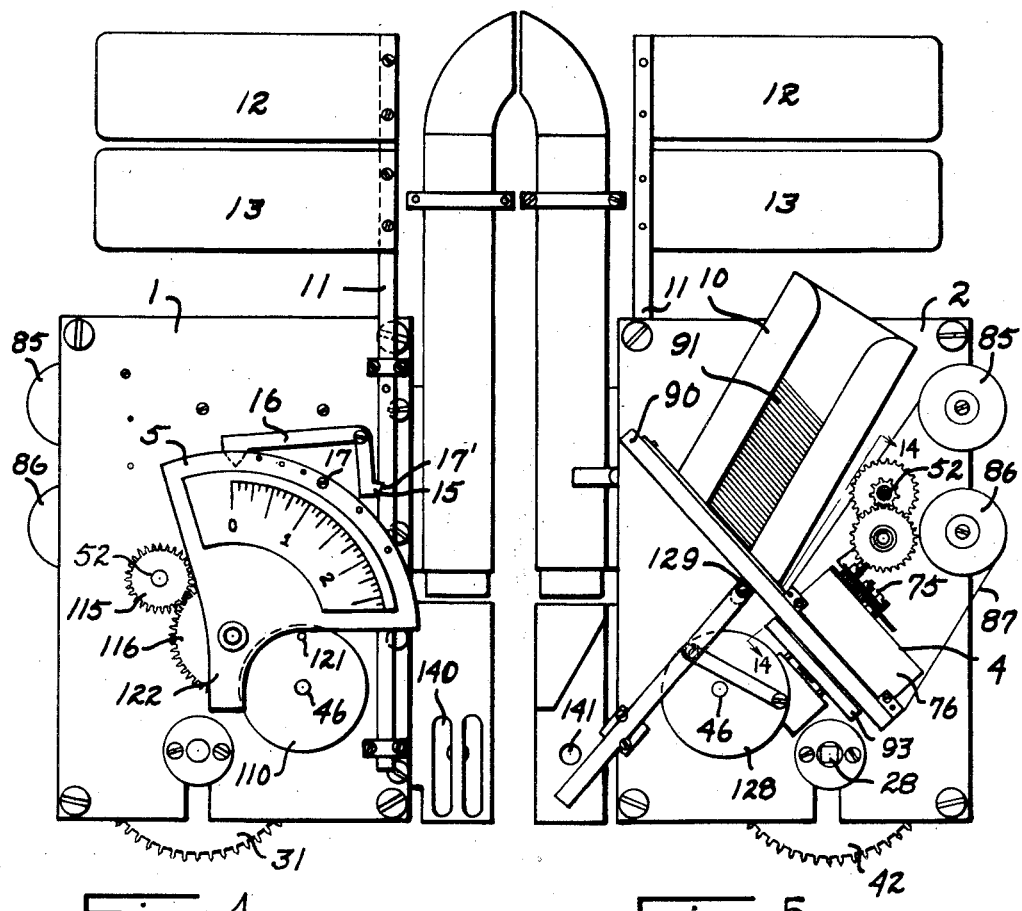
Fig. 4 is a front elevation similar to that in Fig. 1 but illustrating the relative position of parts at the beginning of a parking interval.
Fig. 5 is a rear view of the mechanism shown in Fig. 1 and showing the location and arrangement of the time recording mechanism.
Figure 6:
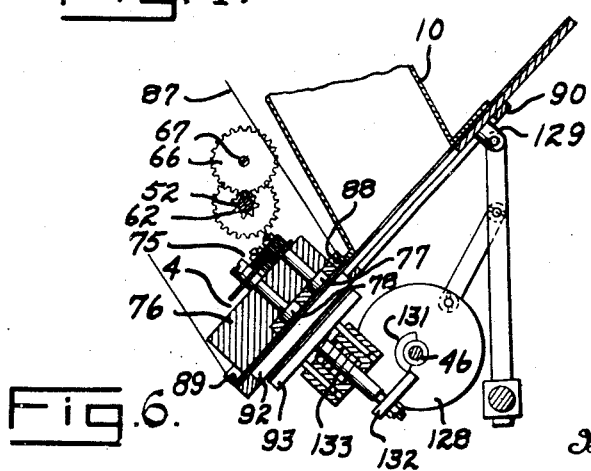
Fig. 6 is a sectional view through the time recording mechanism taken on the line 6—6 in Fig. 8.

A construction illustrating an embodiment of the invention comprises a parking meter mechanism adapted to be inserted into a housing provided with suitable openings to permit visual observation and also to permit access to the interior of the housing. Such construction comprises a framework having front and rear plates 1 and 2 in which are mounted suitable gear trains to drive the time indicating means 3 and a recording mechanism 4 and to also reset the time interval indicator 5 and a semaphore 6.

By means of the construction thus generally described, when a proper coin or token is inserted into the coin receiving slot 7, a ticket previously fed into the time recording means 4 from the magazine 10 receives an imprint thereon of meter identifying information together with the time when the operation of the meter was initiated. This ticket is released from the time recording mechanism 4 and is delivered through a suitable chute to the user of the meter.

At the same time the time interval indicator 5 which is visible to the user of the meter is returned to its initial indicating or zero position and a pillar 11 carrying semaphores 12 and 13, which may be red and green respectively, is elevated to a position so that the latter will be visible and will indicate that the use of the meter is within the time interval for which the meter is set. The pillar 11 is retained in an elevated position by engagement with a projection 15 on a bell crank lever 16 with a notch 17 in the pillar. The opposite end of the bell crank lever 16 may serve as a pointer for the dial on the time interval indicator 5 and is also adapted to be engaged by a projection 17 which may be placed at any of the positions 18 on the indicator to determine the time interval during which the meter may be used upon the deposit of an actuating coin or token.

Figures 7, 8:
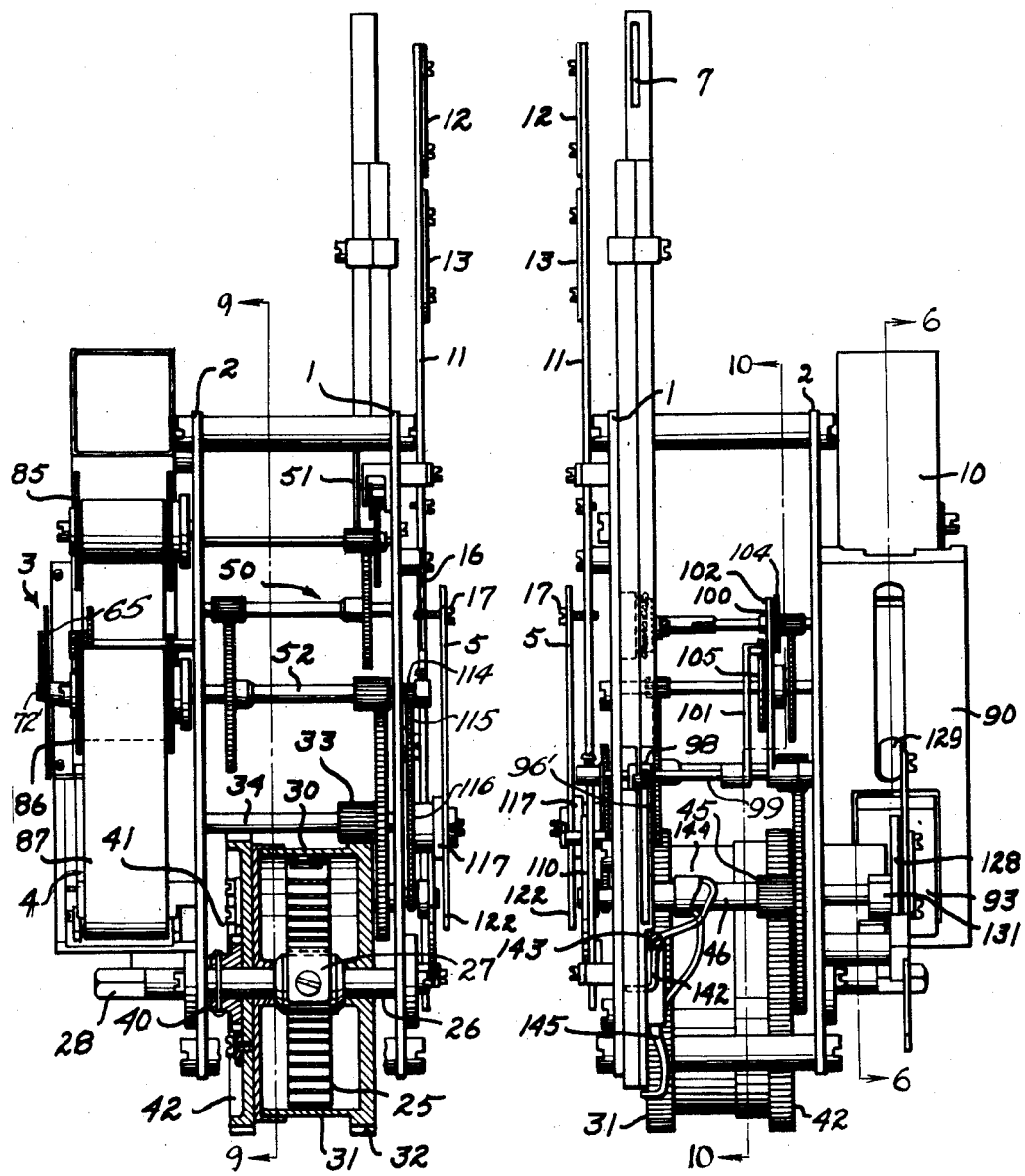
Fig. 7 is a side elevation taken from the left in Fig. 1, the spring barrel and associated parts being shown in section.
Fig. 8 is a side elevation taken from the right of Fig. 1.

Motive power for the actuation of the device may be supplied mechanically or electrically but is shown in the illustrated embodiment as comprising a spring 25 attached to the winding shaft 26 at 27, the shaft 26 being rotatably mounted in the plates 1 and 2. As best seen in Fig. 7, the shaft 26 is provided with a squared end 28 so that the shaft may be rotated by means of a suitable key for winding the spring 25.

The other end of the spring 25 is attached at 30 to the inner surface of a barrel 31 which is rotatably mounted upon the shaft 26 and which is provided with cogs 32 to engage a pinion 33 on shaft 34.

Figure 9:
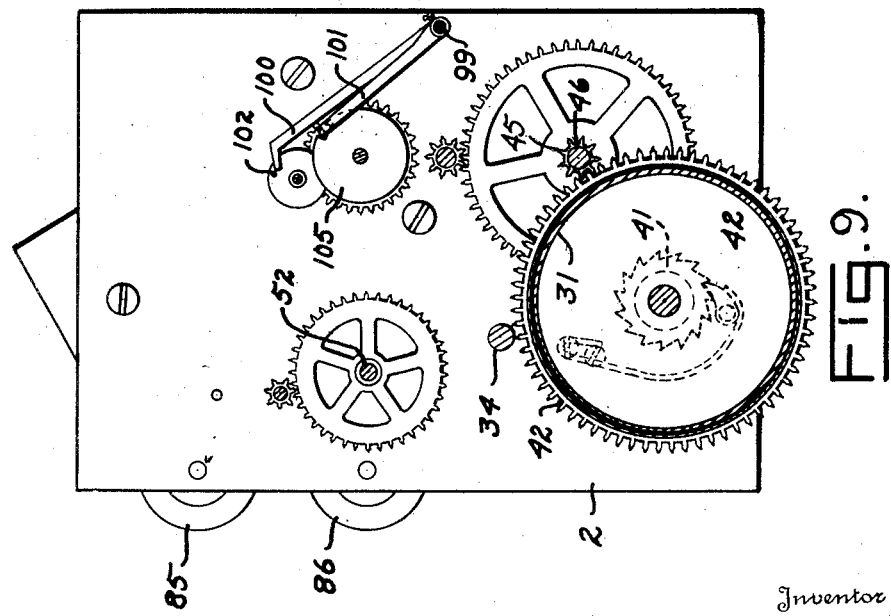
Fig. 9 is a sectional view taken on line 9—9 in Fig. 7 parts being omitted for the sake of clearness.

As already indicated the inner end of the spring 25 is attached to the shaft 26 to which a collar 40 is secured, a ratchet connection 41 being provided between the collar 40 and a gear 42 which is also rotatably mounted upon the shaft 26. The gear 42 meshes with a pinion 45 on shaft 46 (see Fig. 9). It is believed apparent that tension on the spring 25 tends to rotate the barrel 31 and the gear 42 in opposite directions and in this manner to drive the shafts 34 and 46 in opposite directions since the opposite ends of the spring are attached to the barrel 31 and the gear 42 respectively.

By reference to Fig. 7 it will be seen that energy input to the pinion 33 is transmitted through a gear train generally indicated as 50 to a balance wheel and escapement 51 which control the rate of driving of the gear train in a manner well known in the art.

The ratios of the elements in the gear train 50 are such that a shaft 52 drivably connected to such gear train makes one revolution each hour and hence may be utilized to drive the minute hand 65 of the time indicating device 3.

In Figs. 5, 6 and 11 to 14 it will be noted that the shaft 52 extends through the plate 2 and has mounted thereon a sleeve 60 to which a beveled gear 61 and a pinion 62 are affixed. This sleeve and pinion assembly is frictionally attached to the shaft 52 by means of a friction clutch generally referred to as 63. This friction clutch may be of any suitable construction and one form is shown in Fig. 16 as including a friction plate 58 which is splined to the shaft 52 and is constantly urged into engagement with the outer face of the gear 61 by means of a spring 59. The sleeve 60 extends outwardly beyond the pinion 62 and through the dial 64 and has a minute hand 65 mounted thereon.

The pinion 62 drives a double gear 66 mounted on a stud 67 affixed in the plate 2.

The gear 70 rotatably mounted upon the outer end of the sleeve 60 is in turn driven by double gear 66 and has a sleeve portion 71 which extends through the dial 64 and has an hour hand 72' attached thereto.

It is believed obvious that the construction just described constitutes a time indicating device and that the dial 64 may be made visible through a suitable window in the meter housing.

If it is necessary at any time to reset this timing mechanism, the minute hand 65 may be moved, the clutch 63 permitting the desired rotation of the sleeve 60 upon the shaft 52.

The time recording mechanism 4 is also driven through the shaft 52 by means of a beveled gear 72 which engages the beveled gear 61 on the sleeve 60. By means of a shaft fixed to the beveled gear 72, the gear train 75 mounted upon the block 76 of the recorder is driven. In this manner the printing dials 77 and 78, as best seen in Fig. 13 are suitably rotated. These dials have printing characters 79 and 80 which cooperate with characters 81 on the nether face of the block 76. Identifying characters 82 are also provided upon the nether side of the block 76 fixed upon a slide support 90 attached to the meter framework and also supporting the gear train 75. By means of this construction the ticket issued by the meter will identify the particular meter as well as the time when the ticket was issued.

Spools 85 and 86 are mounted upon the plate 2 and carry a printing ribbon 87 which passes beneath rollers 88 and 89 mounted upon the block 76.

A supporting plate 90 extends outwardly from the plate 2 and is positioned closely adjacent the nether face of block 76. The ticket magazine 10 is attached to the plate 90 and is adapted to receive a supply of tickets 91 to be distributed to the users of the meter. Beneath the block 76 the plate 90 is provided with an opening 92 through which a spring pressed plunger 93 is adapted to pass and strike one of the tickets 91 fed from the magazine 10 to a position directly beneath the block 76 and the printing ribbon 87.

The mechanism whereby the tickets 91 are fed into the time recording mechanism 4 and discharged therefrom will be more fully described.

As was previously indicated the time recording mechanism just described, together with the time interval indicator 5 and the semaphore 6 are coin controlled. The mechanism for performing these functions will now be described by reference to the operations which take place when a proper coin is placed in the coin receiving slot 7.

Figure 10:
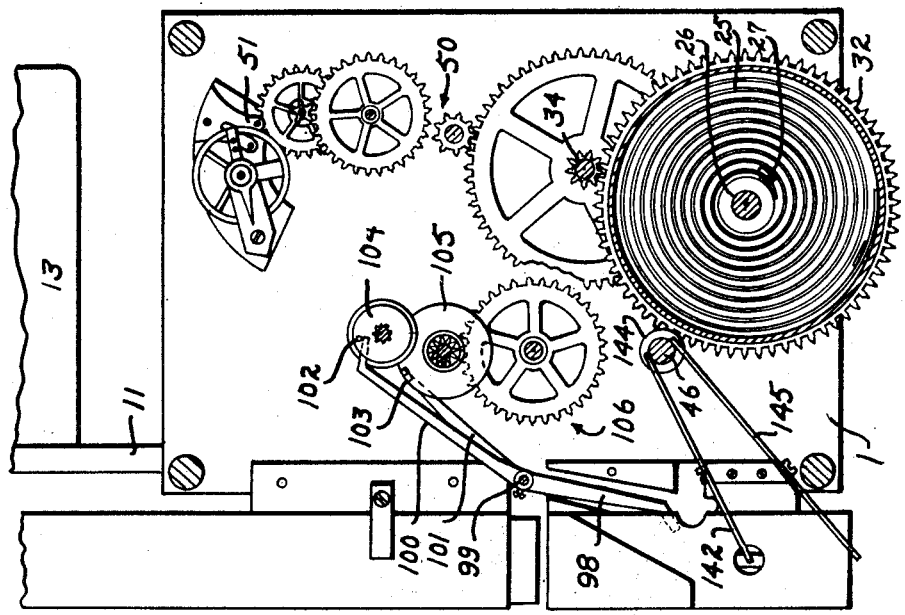
Fig. 10 is a sectional view taken on line 10—10 in Fig. 8.

The coin chute is provided with a passage 95 of such configuration that a coin of improper size will be held in engagement with the right-hand wall of the passage (Fig. 3) by means of a leaf spring extending into the passage and will pass downwardly into the passage 96 and be discharged into a suitable receptacle or returned to the user of the meter depending upon whether the side slot 96' opens to the interior or exterior of the meter housing. A proper coin, however, will fall under gravity and, following the edge configuration of the chute, will urge the leaf spring to the left so that the coin will move into the passage 97 where it will strike the end of a lever 98 fixed to the rock shaft 99 (Fig. 10). A rocking of the shaft 99 will move arms 100 and 101 which are fixed thereto so that these arms will be removed from engagement with a pin 102 and a notch 103 on the wheel 104 and the disc 105 respectively of the gear train which is generally indicated as 106 and which is driven from the shaft 46.

The shaft 46 projects through the plate 1 and has a disc 110 fixed on its outer end. This disc is likewise provided with a notch 111 with which an arm 112 makes engagement, the arm 112 also being fixed upon the rock shaft 99. Hence when a proper coin is deposited in the coin chute, movement of the lever 98 also releases arm 112 from engagement with the disc 110 and the rock shaft 99 will not be permitted to return to its original position until the disc 110 makes a complete revolution during which all necessary operations are executed.

The time interval indicator 5 is driven in a counter-clockwise direction and at a proper speed through a gear 115 which meshes with a pinion 114 on the end of the shaft 52. The gear 115 in turn engages gear 116, which, as best seen in Fig. 16, is provided with a central threaded boss to receive a nut 118 which passes through the time interval indicator 5 and serves to clamp such indicator against a fiber washer 119 so that the indicator is frictionally driven by rotation of the wheel 116 but, at the same time, the indicator may be returned to starting position, as hereafter explained, without disturbing the timing mechanism.

When the gear train 106 is released by the deposit of a coin, the disc 110 rotates in a counter-clockwise direction as indicated by the arrow 120 (Fig. 1) and a pin 121 on the disc engages the downward projection 122 on the indicator dial whereby the dial is returned to its starting position as shown in Fig. 4.

Continued rotation of the disc 110 causes a rearward projection of the pin 121 to engage a finger 125 on the pillar 11 so that the semaphore 6 will be elevated and will be locked in elevated position as previously described.

The rear end of the shaft 46 is also provided with a disc 128 which serves as a crank to move a ticket feeding member 129 longitudinally of the supporting plate 90. This ticket feeding member has a spring projection 130 (see Fig. 14) which frictionally engages and prevents movement of the ticket until the plunger 93 engages the ticket to produce an imprint thereon.

The action of the plunger 93 is effected through a cam surface 131 on the back side of the disc 128. As this disc rotates a ticket is moved downwardly into printing position.

After a predetermined angular rotation of the disc 128, the follower 132 is released from the cam surface 131 and the plunger 93 is free to advance under the influence of a spring 133 which surrounds the plunger stem. The plunger remains in advanced position as the ticket feeding member 129 is moved upwardly by rotation of the disc 128. Before the gear train 106 is stopped in the manner above described, the follower 132 again rides upon the cam surface 131 and the plunger 93 is retracted, whereby the printed ticket is released to fall under gravity from the slide and to pass through a suitable chute (not shown) to the exterior of the meter housing. During completion of the revolution of disc 128 the ticket feeding member 129 advances a new ticket to printing position for issuance upon succeeding use of the device. In event the ticket just printed fails to fall freely from the slide 90 this final operation will force the ticket from the time recording mechanism 4.

It would also be noted that it is desirable to expose the last deposited coin to view and to release this coin when a succeeding coin is deposited. To accomplish this the coin chute is provided with front openings 140 through which a coin may be readily seen. A rear opening 141 is also provided and a finger (see Fig. 8) 142 extends into this opening and is pivoted at 143 upon the plate 1.

The opposite end of this finger engages the face of a cam 144, fixed upon the shaft 46, in such manner that the passage 97 through the coin chute is closed during the interval while a second finger 145, operated from the same cam, is moved to release the previously deposited coin from the chute. Before the gear train 106 has reached its terminal position, the finger 145 returns to a position beneath the passage through the coin chute and the finger 142 is withdrawn so that the last deposited coin is free to drop to a visible position behind the openings 140.

From the foregoing description it is believed that the objects, advantages and operation of the invention, and the illustrated embodiment thereof are apparent. By way of summary it may be stated that the deposit of the proper coin into the slot 7 will fall under gravity and will strike the lever 98 to rotate the rock shaft 99 so that the gear train 106 will be released for operation, whereby the time interval indicator 5 will be returned to zero, the semaphore 6 will be moved to elevated position and the time recording mechanism 4 will print desired information upon a ticket from the magazine 10, such ticket being thereafter delivered to the user of the meter.

At the end of the time interval for which the meter is set, the projection 17 on the time interval indicator 5 lifts the end of the bell crank lever 16 so that the semaphore 6 drops to a position to indicate that the parking interval is terminated. The time interval indicator 5, however, continues to move and it is thus possible to observe the over-parking time.

What is claimed is:

1. In a device of the class described, a semaphore movable against the force of gravity to an indicating position, a timing mechanism, a time interval indicator clutched thereon, so that said indicator may be driven thereby but moved relative to the driving mechanism, a disc operable to engage and set the time interval indicator at an initial indicating position and to thereafter lift the semaphore to indicating position, a latch for holding the semaphore in indicating position, means for driving said timing mechanism and said disc, means normally restraining said disc from rotation, means for guiding a coin to release said last mentioned means so that said disc completes its function and returns to initial position.

2. In a device of the class described, a semaphore movable against the force of gravity to an indicating position, a timing mechanism, a time interval indicator clutched thereon, so that said indicator may be driven thereby but moved relative to the driving mechanism, a disc operable to engage and set the time interval indicator at an initial indicating position and to thereafter lift the semaphore to indicating position, a latch for holding the semaphore in indicating position, means for driving said timing mechanism and said disc, means normally restraining said disc from rotation, means for guiding a coin to release said last mentioned means so that said disc completes its function and returns to initial position, and means on said time interval indicator for releasing said latch at the end of a predetermined time interval so that the semaphore moves under gravity to its initial position.

3. In a device of the class described a timing mechanism, a time interval indicator clutched thereon, printer dials operatively connected to said timing mechanism and driven thereby, setting mechanism for moving said indicator to an initial indicating position, means for driving each of said mechanisms, coin released normally set means controlling the functioning of said setting mechanism, said setting mechanism including a shaft and cam means driven thereby for engaging and moving the time interval indicator to an initial indicating position, a magazine for tickets adapted to receive printing thereon, and means operatively connected to said shaft for moving a ticket into engagement with said printer dials to print upon the ticket the time of setting the time interval indicator.

4. In a device of the class described the combination of, a time interval indicator, timing mechanism for driving said indicator at a predetermined rate in one direction, printing dials driven by said mechanism, setting mechanism including a shaft and camming disc thereon for moving the indicator in the opposite direction to an initial indicating position, a power unit for driving both of said mechanisms, coin released means normally restraining the rotation of said shaft, and means operable by said shaft for moving a ticket into engagement with said printing dials to print upon the ticket the time of setting the time interval indicator.

WALTER RUSKA.